United States Patent Office 3,425,925
Patented Feb. 4, 1969

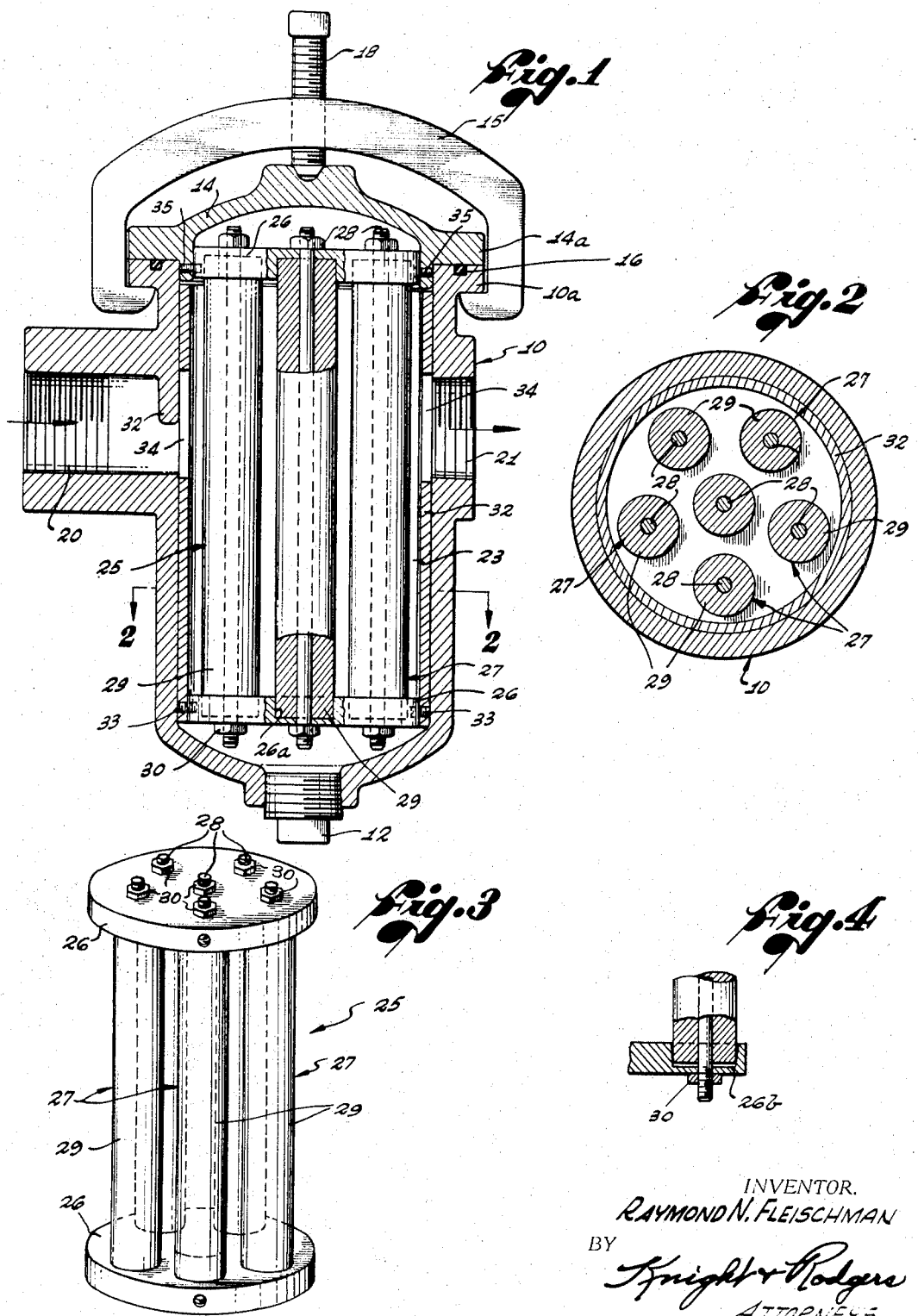

3,425,925
ELECTROLYTIC WATER CONDITIONING UNIT AND ELECTRODE ASSEMBLY THEREFOR
Raymond N. Fleischman, Whittier, Calif., assignor to Aqua-Vel, Whittier, Calif., a corporation of California
Filed Dec. 24, 1964, Ser. No. 420,873
U.S. Cl. 204—197          11 Claims
Int. Cl. C02b 1/82

ABSTRACT OF THE DISCLOSURE

A water conditioning unit has a housing of copper bearing material within which is a removable assembly of magnesium bearing metal rods. The housing and the rods form a pair of electrodes, the rods being consumed in the process of conditioning the water. The overall design affords high efficiency in operation and simplifies access for service and replacement of the electrode rods.

---

The present invention relates generally to apparatus for treating water to reduce the undesirable effects of dissolved minerals; and it relates more particularly to an electrolytic water conditioning unit including a sacrificial metallic electrode which may be termed the active element of the unit.

Conditioning water as hereinafter referred to is resorted to for various reasons in order to eliminate or at least reduce the undesirable effects of dissolved salts in the water. This conditioning may be distinguished from the usual softening procedures effected either through the addition of chemicals or treatment by ion-exchange zeolites which remove hardness by substituting sodium ions for calcium and magnesium ions.

Among the more important advantages gained by water conditioning are elimination of the formation of a hard scale or deposit on heated surfaces, reduction or elimination of corrosion in the water-carrying conduits, improvement in the taste of water for drinking and cooking purposes and improvement in the value of water for irrigation of crops. From the economic standpoint, these advantages are important as they produce lowered maintenance and replacement costs and decreased cost of operating heating equipment.

It is well known that a current will flow between two electrodes of different metals when they are connected together by a wire and are immersed in water which contains an acid or a base providing an electrolyte. This galvanic action occurs in conduit systems when dissimilar metals are placed in contact with the water carried, since the water from natural sources ordinarily contains sufficient dissolved salts to provide the necessary electrolyte to support galvanic action.

In accordance with well-known electro-chemical principles, a device of this character acts as a galvanic couple in which the positive electrode or anode is electrolytically dispersed into the water to produce metallic ions that combine with the water to produce hydrated metallic ions. These metallic ions react with hydroxyl ions from the water to yield metallic hydroxides. While the processes involved are not fully understood because of their complexity, it appears that the metal ions themselves or the insoluble metallic hydroxides that are formed react with or in some manner combine with the calcium and magnesium ions or salts present in the water. Since it is the calcium and magnesium ions that produce the hardness, removal of these ions has the effect of reducing the hardness of the water. The result is that a soft scale is formed that is easily broken up and removed, in contrast to the well-known hard, adherent scale of calcium and magnesium carbonates that otherwise builds up on heated surfaces in the case of untreated hard water.

The presence of a hard scale, commonly referred to as "boiler scale," produces serious economic losses. Not only does this scale reduce the rate of heat transfer through the conduit walls, but ultimately it also fills the conduit and reduces the cross-sectional area available for water flow. This condition obviously creates a less efficient heat transfer condition and decreases the efficiency of the unit from a thermal standpoint but also results in serious costs for maintenance and replacement of equipment.

As will become apparent from further description, advantage can also be taken of the treatment of water in a unit of the type hereinafter described to protect pipes from electrolytic corrosion, thereby prolonging their life and reducing maintenance and replacement costs of conduits, even when they are not heated surfaces.

In order to provide an effective and efficient water conditioning unit, it is a general object of the invention to provide a unit having electrodes of dissimilar metals in which a firm and continuous contact is maintained between the electrodes throughout the operative life of the unit, such contact being maintained over an area adequate to obtain the desired electrochemical effects.

It is also an object of the present invention to provide a water conditioning unit of the character described which can be inserted in a conduit for essentially in-line flow without introducing into the conduit any substantial losses due to pressure drop across the unit, while still obtaining a desirable degree of turbulence within the unit.

A more particular object of the present invention is to provide an electrode assembly of novel design for a water conditioning unit in which a sacrificial metal electrode is held firmly in such a manner that the sacrificial metal is dissolved evenly over its entire length and is at all times held against dropping away in large pieces.

Another object of the present invention is to provide an electrode assembly of novel design that is especially adapted to easy and thorough cleaning of the electrode surfaces.

Another object of the present invention is to provide a unit of novel construction in which the electrodes of sacrificial metal can be varied in composition in order to best adapt the unit to particular circumstances.

The above objects and advantages of the present invention are achieved by providing an electrochemical water conditioner comprising an outer housing of a copper bearing metal and defining an interior cavity through which water flows from an inlet to an outlet; and a removable electrode assembly in the interior cavity of the housing, said assembly comprising a plurality of magnesium bearing metal rods which are held firmly in electrically conductive contact with the outer housing.

The electrode assembly comprises a pair of metal end plates, preferably of a copper bearing metal to provide a negative electrode, and a plurality of rods extending between said end plates, and preferably including a magnesium bearing metal or other metal which provides a positive electrode. Means are provided for maintaining a firm contact between the plates and the rods in the form of a core of a copper bearing metal passing through each of the rods and extending beyond the ends thereof, the ends of the core being threaded and extending through the end plates of the assembly whereby nuts or the like can be applied to the threaded ends of the rod cores in order to draw the end plates against the rods and maintain at all times a firm electrical contact between the various elements of the electrode assembly. The rods are formed by casting magnesium, or an alloy containing the desired amount of magnesium and any other metals, around the copper bearing core, which is typically a brass rod. The electrode assembly also preferably includes a sleeve of copper bearing metal extending for all or most of the length of the assembly and surrounding the group of positive electrodes. The sleeve is removably attached to at least one of the end plates in a manner to make the sleeve a part of the cathode system.

How the above objects and advantages of the present invention, as well as others not specifically referred to, are attained will be more readily understood by reference to the following drawing, in which:

FIGURE 1 is a longitudinal median section through a water conditioner embodying the present invention, the section being taken through opposed inlet and outlet openings in the housing.

FIGURE 2 is a transverse cross-section through the housing and electrode assembly taken on line 2—2 of FIGURE 1.

FIGURE 3 is a perspective of the electrode assembly removed from the housing but without the surrounding sleeve.

FIGURE 4 is a fragmentary section of one end of a rod electrode in an adjoining portion of the end plate of the assembly, showing a variational manner of seating the rods in the end plates.

Referring now to the drawing, and more particularly to FIGURE 1, the outer housing is generally indicated at 10. While not limited to a particular shape, it will be seen from FIGURE 2 that the housing is circular in cross-section, a preferred shape. The housing is normally closed at one end by an integral wall. Since the housing is ordinarily arranged with its longitudinal axis vertical, as shown in FIGURE 1, the lower end wall is provided with a drain plug 12 which is removable for servicing the unit. The other or upper end of the housing is closed by cover 14 which is firmly held in place over the open end of the housing by screw clamp 15.

Housing 10 and cover 14 are provided with mating peripheral flanges 10a and 14a respectively, a watertight seal at this point between the flanges being attained by any suitable type of sealing means, as, for example, the O-ring 16.

Clamp 15 bridges the housing and engages the underside of flange 10a; and the clamp is also provided with screw 18 bearing against a central seat on cover 14 to draw the housing and cover together.

Housing 10 is particularly designed for connection to aligned conduits and is therefore provided with coaxial inlet opening 20 and outlet opening 21, respectively. The arrangement of these two openings opposite each other in the housing provides in effect for in-line flow and facilitates the installation of the conditioner in an existing pipe line by simply removing a suitable length of pipe, no re-alignment of the line being required. Inlet and outlet openings 20 and 21 are preferably internally threaded with conventional pipe threads; but it will be realized that they may instead be provided with any suitable type of means for effecting a connection to a conduit.

Housing 10 has an internal cavity 23 in which is placed the electrode assembly indicated generally at 25. The assembly can be inserted into the housing or removed therefrom for servicing through the open upper end of the housing after cover 14 is removed.

The electrode assembly comprises a pair of metal end plates 26, between which extend a plurality of rods 27. As may be seen clearly in FIGURE 1, each end plate 26 preferably is provided with a plurality of recesses 26a of circular cross-section each adapted to receive with a snug fit the end of a rod 27. These recesses 26a are shown in FIGURE 1 as having cylindrical side walls whereby one end of the associated rod 27 can seat firmly against an opposing face on end plate 26 at the bottom of the recess.

From FIGURES 1 and 2, it will be seen that each of the rod-shaped electrodes 27 comprises a central core 28 surrounded by a sheath 29. Core 28 is longer than sheath 29, projecting beyond the sheath at each end. The projecting ends are preferably threaded, as shown in FIGURES 1 and 3, to receive a nut 30 which may be tightened on the core in order to draw end plate 26 tightly against the end of sheath 29.

Although the electrode assembly 25 as so far described is fully operational to condition water, it is preferred to add a metallic sleeve 32, shown in FIGURES 1 and 2, which surrounds the rod electrodes 27 but is spaced therefrom. Sleeve 32 is preferably a length of drawn tubing to present smooth interior and exterior surfaces. The inside diameter of the tubing is large enough for the sleeve to pass over at least the lower end plate 26 to which it is attached by recessed-head screws 33 in order to insure a firm, continuous mechanical and electrical connection to the cathode electrode system of the assembly.

The outside diameter of the tubing is designed to be a loose sliding fit inside the housing. Contact with the housing is beneficial; and in general it is desired to reduce to a minimum clearance between the housing and sleeve.

Sleeve 32 has opposed ports 34 which register with inlet 20 and outlet 21, as shown, to permit water to flow through the unit.

Housing 10 and its cover 14 are a part of the negative electrode system of the unit; and for this reason, they contain a metal which is below hydrogen in the electromotive series of metals, such metal normally being copper for economic reasons, although silver and gold are other possible and highly suitable metals below hydrogen in the series. End plates 26 and sleeve 32 are also made of a copper bearing metal since they are part of the negative electrode system. Thus the housing and cover are normally made of cast bronze. Sleeve 32 is conveniently made of drawn copper tubing while end plates 26 may be copper or bronze. Thus the term "copper bearing metal" is intended to include copper and copper alloys.

Rods 27 extending between end plates 26 of the electrode assembly are composite members. Each core 28 is in effect a part of the cathode system of the galvanic couples and consequently is a copper bearing metal, brass being suitable and preferred for this purpose since it is easily machined. Around this core of copper bearing metal is cast a sheath 29 which becomes the anode of the galvanic couple. This sheath is preferably either an alloy containing a suitable percentage of magnesium, when it is desired to add any other element, or substantially pure cast magnesium. In either case the sheath is a magnesium bearing metal. However, aluminum and zinc are other metals that can function as a sacrificial anode, though less effectively than does magnesium.

Forming each of the rods 27 of the electrode assembly by this procedure of casting magnesium or an alloy thereof around a brass core rod ensures that there is a firm and continuous bond, both mechanically and electrically, between the sheath and the rod throughout the entire length of each rod 27.

A firm and continuing engagement between each rod 27 and the two end plates 26 is obtained by providing circular seats or sockets in each of the end plates into which rods 27 fit and then drawing the end plates down tightly against the rods by means of the several nuts 30 on the threaded portions of core rods 28 which project through and beyond the outer faces of end plates 26. Sleeve 32 is connected to at least one end plate by screws 33 or the like. In this manner, the electrode assembly is mechanically united into a firm, unitary assembly. Since the mechanical strains are all taken by copper bearing members of the cathode system, it will be seen that disintegration or dissolution of the magnesium bearing portions of the rods does not weaken the structure mechanically.

A firm contact is also maintained between the electrode assembly and the housing. Cover 14 is provided with an internal annular flange 14a which has a sliding fit inside the housing and outside the upper end plate 26 of the electrode assembly. While simple mechanical engagement between the cover and end plate may be resorted to, it is preferred to connect the electrode assembly to the cover by positive connecting means, such as recessed-head screws 35 passing through flange 14a into the upper end plate 26. When the cover is tightened down by means of clamp 15, the electrode assembly is firmly in electrical contact with the housing. Even though cover 14 might be more or less insulated electrically by gasket 16 or other water sealing means, or isolated from the housing as a result of a poor fit, the electrical connection between the housing and the cover is assured by virtue of the metallic clamp 15 which forms an electrical connection between these two elements, and by screws 35.

When the magnesium bearing anodes and the copper bearing cathode members of the system are immersed in water, they form galvanic couples because of the normal presence in the water of a sufficient quantity of dissolved salts to provide an electrolyte. Under these conditions, electrons flow through the electrolyte to each anode which goes into solution. As a result, the magnesium or other metal of the anode protects not only the copper bearing metal of the housing but also the metal of the pipe connected to the housing so that electrolytic corrosion of these latter members does not occur, or is at least reduced.

The formula for this reaction is:

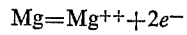

$$Mg = Mg^{++} + 2e^-$$

The magnesium ions from the above reaction react with the water to form magnesium hydroxide in the following manner:

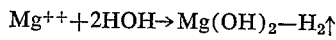

$$Mg^{++} + 2HOH \rightarrow Mg(OH)_2 - H_2\uparrow$$

The magnesium hydroxide thus formed is a very finely divided suspension forming the disperse phase of a colloid. There may also be magnesium metal ions in colloidal form. The colloid thus formed is notable in that there is a marked affinity between the disperse phase, consisting of metallic particles of magnesium and/or magnesium hydroxide, and the water constituting the continuous phase of the colloidal suspension.

The electrical conductance of water containing a colloid falls off in proportion to the concentration of the colloid present. This is believed to be the reason why the water conditioning unit reduces or eliminates corrosion due to galvanic action, since it produces a colloidal suspension of magnesium hydroxide and metallic magnesium. The disperse phase of the colloid also tends to adsorb or in some other way combine with the ionized particles of the dissolved salts which produce hardness in water, with a result that the scale produced is of a soft and crumbling nature, which is in marked contrast with the hard, adherent scale normally formed in pipes of boilers and the like. Consequently, even though this treated water is in contact with a heated surface, little or no scale forms on the heated surface, most of the scale being either carried through or at least easily removable by cleaning the conduit.

A particular advantage of the novel construction of the electrode assembly is the fact that the anode members are always supported mechanically by the cores 28 which are not consumed, while at the same time a high quality electrical contact is maintained between the sheath 29 and the core of each of the rods of the assembly. As a consequence, the magnesium bearing sheaths, which are expendable, can be substantially entirely consumed without allowing pieces of the magnesium sheath to drop off and also without any substantail impairment in efficiency of the electrode assembly throughout its normal life.

Rods 27 are preferably arranged with their axes in a direction generally transverse to the flow through the housing. Thus in passing from inlet 20 to outlet 21, the water flows past a plurality of galvanic couples. At the same time, a mild degree of turbulence is introduced into the incoming water by baffle 36 at the inlet which causes the water within the interior cavity 23 to be thoroughly mixed and to contact to the maximum degree the surfaces of the electrode rods.

FIGURE 4 illusrates a variational formation of the socket in end plate 26. By referring to this figure, it will be seen that the socket 26b has inwardly tapered walls against which the outer surface of a rod 27 wedges as the nut 30 is tightened. This results also in a firm contact between the end plate and the rod; but tends to concentrate the contact on the side walls of the rod rather than against the end surface as is the case with the formation of the socket 26a previously described.

It will be apparent from FIGURE 1 that the entire electrode assembly can easily be removed from the housing for servicing and replacement. The efficiency of the water conditioner depends to a large extent upon the cleanliness of the electrodes and consequently it is often desirable to remove the electrode assembly for cleaning at much shorter intervals of time than the interval between replacements. Consequently, accessibility of the electrodes for cleaning is an important factor in maintaining proper operation. When cover 15 is removed, the entire electrode assembly 25 is removed from interior cavity 23. It will be noted that each of the electrode rods, upon removal of screws 33 and sleeve 32, has its entire surface easily accessible for cleaning and removal of any deposits that may have accumulated on it and likewise the entire assembly can easily be taken apart, either for cleaning or for replacement of individual rods 27. Likewise sleeve 32 is easily cleaned as it is removed from the housing with the electrode assembly. Any soft scale or precipitate forming on the cathode collects on the inner surface of the sleeve from which it can be easily removed. This is effective in keeping the cathode clean and efficient; and has the effect of providing the housing with a removable liner. Access for maintenance can be effected merely by removing cover 14 and does not require any disconnection of the conduits at 20 and 21.

From the foregoing description, it will be evident that various changes in the precise design and arrangement of the parts of the water conditioner constituting the present invention may occur to persons skilled in the art without deparing from the spirit and scope of the present invention. Accordingly, it is to be understood that the above description is considered as being illustrative of, rather than limitative upon, the invention as defined by the appended claims.

I claim:
1. An electrolytic water conditioner comprising:
   an outer housing of metal providing a negative electrode, said housing defining an interior cavity and having water inlet and outlet openings communicating with the interior cavity;
   a removable and renewable electrode assembly in said interior cavity;
   said assembly comprising a pair of metal end plates of a metal providing a negative electrode, a plurality of rods extending between said end plates and each rod including a core of a metal providing a negative electrode and a shaft bonded to said core of a metal providing a positive electrode, and means maintaining continuous electrical contact between the plates and the rods;
   and means providing electrical contact between the housing and the electrode assembly.
2. An electrolytic water conditioner as in claim 1 in which each of said rods comprise a core of a copper bearing metal and a sheath of a magnesium bearing metal.

3. An electrolytic water conditioner as in claim 2 in which the core of each said rods has a screw threaded portion at each end projecting through an opening in one end plate and nut means on the projection forcing the plate and rod into firm electrical contact.

4. An electrolytic water conditioner as in claim 1 in which the electrode assembly also includes a negative electrode element in the form of a metal sleeve surrounding and spaced from said rods and removable from the housing for cleaning, said sleeve being attached to one of the end plates.

5. An electrolytic water conditioner as in claim 4 in which the negative electrode element is a sliding fit within the outer housing and is electrically connected to the electrode assembly.

6. An electrolytic water conditioner comprising:
an outer housing of a copper bearing metal defining an interior cavity, said housing having water inlet and outlet openings on opposite sides thereof communicating with the interior cavity;
the longitudinal axis of said cavity extending generally normal to a line connecting said inlet and outlet openings;
and a removable electrode assembly in said interior cavity comprising a pair of end plates and a plurality of spaced, smooth surfaced rod-like anodes held by and between said end plates with the axes of said rods substantially parallel to each other and to the longitudinal axis of the interior cavity;
a removable cover closing one end of the cavity and having an annular flange engaging one end plate to press the electrode assembly into firm contact with the housing when the cover is secured in place.

7. An electrolytic water conditioner comprising:
an outer housing of a copper bearing metal defining an interior cavity, said housing having water inlet and outlet openings communicating with the interior cavity;
an electrode assembly in said interior cavity, said assembly comprising a plurality of parallel rods, each having a core of a copper bearing metal and a sheath bonded to said core of a magnesium bearing metal, and a plate of copper bearing metal electrically and mechanically interconnecting said rods;
and means effecting a firm electrical connection between the housing and the electrode assembly.

8. An electrolytic water conditioner, comprising:
a housing having an interior cavity and water inlet and outlet openings communicating with the cavity;
an electrode assembly in said interior cavity, said assembly comprising a plurality of parallel rods, each rod having a core of a copper bearing metal and a sheath bonded to said core of a magnesium bearing metal, and a plate of copper bearing metal electrically and mechanically interconnecting said rods;
and means effecting a firm electrical connection between the housing and the electrode assembly.

9. An electrode assembly for an electrolytic water conditioner comprising:
a pair of spaced rigid copper bearing end plates;
a plurality of magnesium bearing rods extending between the end plates, each rod comprising a core of a copper bearing metal;
said end plates each having a plurality of inwardly tapered sockets and the individual rods being seated at each end in one of said sockets;
and screw means for drawing the end plates into firm contact with the rods at said sockets.

10. An electrode assembly for an electrolytic water conditioner comprising:
a pair of spaced copper bearing end plates;
a plurality of rods extending between and in contact with said end plates, each rod having a core of a copper bearing metal and a sheath of a magnesium bearing metal.

11. An electrode assembly as in claim 10 that also includes a sleeve of copper bearing metal surrounding and spaced from all said rods, said sleeve being mechanically and electrically connected to one of said end plates.

References Cited

UNITED STATES PATENTS

| | | | |
|---|---|---|---|
| 680,441 | 8/1901 | Rhodin | 204—286 |
| 1,608,709 | 11/1926 | Mills | 204—197 X |
| 2,461,325 | 2/1949 | Jones | 204—248 |
| 2,478,478 | 8/1949 | Grebe | 204—197 |
| 2,481,827 | 9/1949 | Cox | 204—288 |
| 2,524,511 | 10/1950 | Butler | 204—248 |
| 2,607,725 | 8/1952 | Butler | 204—248 |
| 3,026,259 | 3/1962 | Phillips | 204—249 |

JOHN H. MACK, *Primary Examiner.*

A. C. PRESCOTT, *Assistant Examiner.*

U.S. Cl. X.R.

204—148, 149, 150, 248